(12) United States Patent
Mammen et al.

(10) Patent No.: US 8,836,736 B2
(45) Date of Patent: Sep. 16, 2014

(54) VARIABLE FLOWER DISPLAY BACKLIGHT SYSTEM

(75) Inventors: Neil Mammen, San Jose, CA (US); Ashley Penna, San Francisco, CA (US); Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 158 days.

(21) Appl. No.: 13/502,095

(22) PCT Filed: Oct. 13, 2010

(86) PCT No.: PCT/US2010/052443
§ 371 (c)(1),
(2), (4) Date: Apr. 13, 2012

(87) PCT Pub. No.: WO2011/047003
PCT Pub. Date: Apr. 21, 2011

(65) Prior Publication Data
US 2012/0200617 A1 Aug. 9, 2012

Related U.S. Application Data

(60) Provisional application No. 61/251,652, filed on Oct. 14, 2009.

(51) Int. Cl.
| | |
|---|---|
| *G09G 5/10* | (2006.01) |
| *G09F 13/04* | (2006.01) |
| *G02F 1/1335* | (2006.01) |
| *F21V 14/00* | (2006.01) |
| *F21V 8/00* | (2006.01) |

(52) U.S. Cl.
CPC ...... *G02F 1/133606* (2013.01); *G02F 2203/62* (2013.01); *G02F 1/133605* (2013.01); *G02F 1/133603* (2013.01); *F21V 14/003* (2013.01); *G02F 2001/133601* (2013.01); *G09G 2320/0209* (2013.01); *G02B 6/0011* (2013.01); *G02F 1/133611* (2013.01)
USPC .......................... 345/690; 362/97.1; 362/97.2

(58) Field of Classification Search
CPC ...... G02F 1/133602–1/133611; G02F 1/1323; G02F 1/1326; G02F 1/133; G02F 2203/62; G02F 2001/133601–2001/133607; H01L 25/0753; H01L 33/54; H01L 33/58; H01L 33/60; G09G 2320/0209; F21V 14/00; F21V 14/003
USPC .................. 345/102, 207, 175, 690, 599, 32; 362/97.1–97.4, 561, 237, 296.02, 612, 362/617, 245–246; 349/62, 64, 68, 33, 61; 359/296, 459, 449, 388; 257/98; 348/333.09; 353/98; 313/113
See application file for complete search history.

(56) References Cited

U.S. PATENT DOCUMENTS

| | | | |
|---|---|---|---|
| 4,652,851 A | 3/1987 | Lewin | |
| 5,300,942 A * | 4/1994 | Dolgoff | 345/32 |
| 6,130,730 A * | 10/2000 | Jannson et al. | 349/65 |
| 6,538,814 B2 | 3/2003 | Hunter et al. | |
| 6,992,718 B1 * | 1/2006 | Takahara | 348/333.09 |
| 7,019,900 B2 | 3/2006 | Benning | |
| 7,072,096 B2 * | 7/2006 | Holman et al. | 359/298 |
| 7,170,506 B2 | 1/2007 | Eldon | |
| 7,234,837 B2 * | 6/2007 | Hanano | 362/246 |
| 7,635,194 B2 * | 12/2009 | Kim et al. | 362/97.3 |
| 7,832,904 B2 | 11/2010 | Doherty | |
| 8,004,747 B2 | 8/2011 | Frazier | |
| 8,334,942 B2 * | 12/2012 | Aoki | 349/62 |
| 8,547,501 B2 * | 10/2013 | Ha et al. | 349/64 |
| 2002/0113534 A1 * | 8/2002 | Hayashi et al. | 313/113 |
| 2003/0202349 A1 * | 10/2003 | Suehiro et al. | 362/245 |
| 2005/0184952 A1 * | 8/2005 | Konno et al. | 345/102 |
| 2006/0249742 A1 * | 11/2006 | Noh et al. | 257/98 |
| 2007/0018185 A1 * | 1/2007 | Hung | 257/98 |
| 2007/0153515 A1 | 7/2007 | Hong | |
| 2007/0247833 A1 | 10/2007 | Lee | |
| 2007/0291197 A1 * | 12/2007 | Furukawa et al. | 349/68 |
| 2008/0030691 A1 * | 2/2008 | Godo | 353/98 |
| 2008/0088769 A1 * | 4/2008 | Kim et al. | 349/61 |
| 2008/0100773 A1 * | 5/2008 | Hwang et al. | 349/62 |
| 2008/0290280 A1 | 11/2008 | Ruetten | |

| | | | |
|---|---|---|---|
| 2009/0066878 A1* | 3/2009 | Ogiro et al. | 349/62 |
| 2009/0086508 A1* | 4/2009 | Bierhuizen | 362/617 |
| 2009/0097230 A1 | 4/2009 | Masuda | |
| 2009/0141001 A1* | 6/2009 | Kuroda et al. | 345/175 |
| 2009/0219463 A1* | 9/2009 | Hung | 349/68 |
| 2009/0273727 A1* | 11/2009 | Kubota et al. | 349/62 |
| 2010/0079980 A1* | 4/2010 | Sakai | 362/97.1 |
| 2010/0141572 A1* | 6/2010 | Kamada | 345/102 |
| 2010/0277950 A1* | 11/2010 | Shchekin et al. | 362/609 |
| 2011/0051044 A1* | 3/2011 | Segawa | 349/64 |
| 2011/0317399 A1* | 12/2011 | Hsu | 362/97.1 |
| 2012/0008063 A1* | 1/2012 | Asamizu | 349/61 |
| 2012/0133673 A1* | 5/2012 | Ninan | 345/599 |
| 2012/0140446 A1* | 6/2012 | Seetzen et al. | 362/97.1 |
| 2013/0301241 A1* | 11/2013 | Maeda, Yasutoshi | 362/97.1 |
| 2014/0133180 A1* | 5/2014 | Sakai | 362/612 |

FOREIGN PATENT DOCUMENTS

| | | |
|---|---|---|
| DE | 4419365 | 12/1995 |
| JP | H03-050703 | 5/1991 |
| JP | H04-016811 | 1/1992 |
| JP | 2005-339822 | 12/2005 |
| JP | 2007-066634 | 3/2007 |
| JP | 2007-324047 | 12/2007 |
| JP | 2007324046 | 12/2007 |
| JP | 2008-159451 | 7/2008 |
| JP | 2009-204734 | 9/2009 |
| WO | 0201288 | 1/2002 |
| WO | 2009020138 | 2/2009 |

OTHER PUBLICATIONS

International Preliminary Report on Patentability for PCT/US2010/052443 issued on Apr. 17, 2012.

* cited by examiner

*Primary Examiner* — Dwayne Bost
*Assistant Examiner* — Darlene M Ritchie

(57) ABSTRACT

Techniques for using variable flower assemblies to control light leakage between designated portions of light-emitting elements are provided. In some embodiments, a variable flower assembly (100) comprises a plurality of light-transmissive segments (102-1, 102-2, . . . , 102-6) each may be electronically set to a different light-transparency level. The variable flower assembly substantially forms a tube around a light-emitting element (104) mounted on a first plane. A first edge of each of the light-transmissive segments collectively surrounds the light-emitting element on a second plane substantially parallel to the first plane. A second opposing edge of each of the light-transmissive segments collectively forms an opening of the tube. In some embodiments, a reflective assembly (120) which reflectance level is electronically controllable may surround the variable flower assembly.

24 Claims, 13 Drawing Sheets

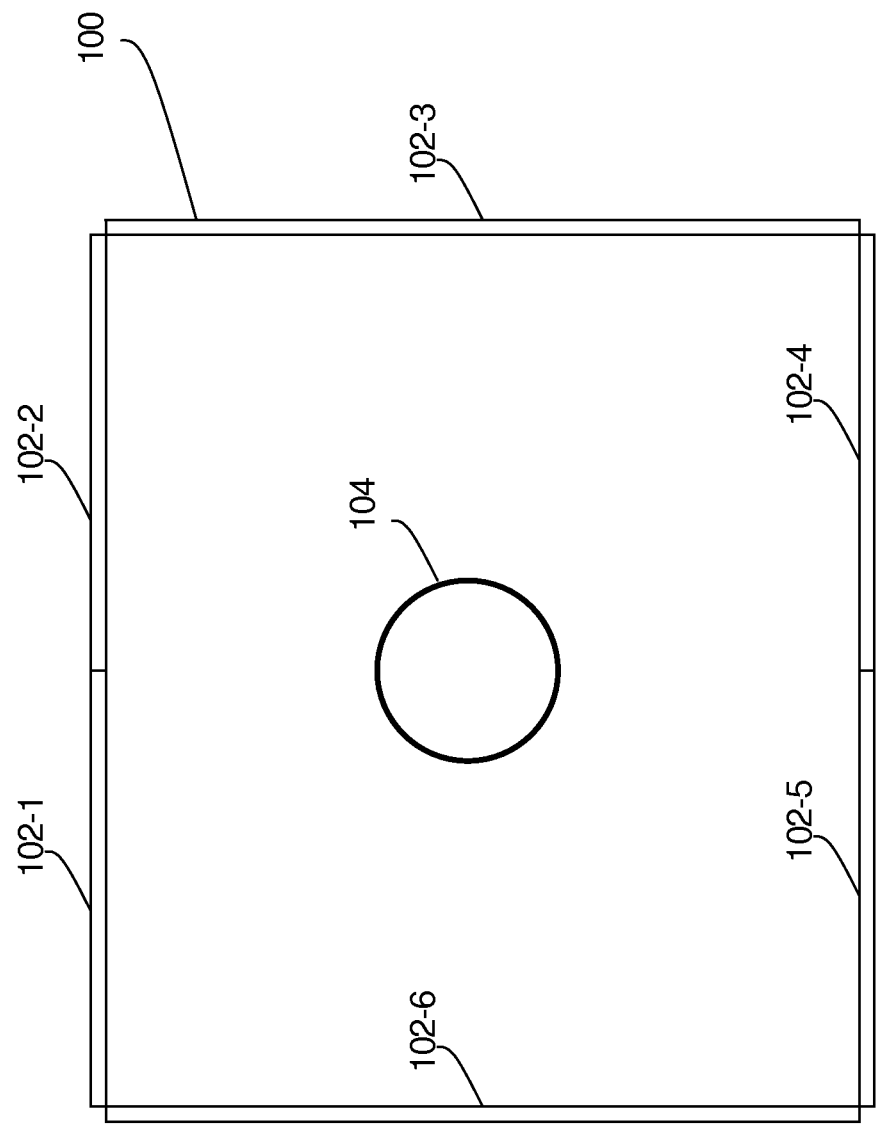

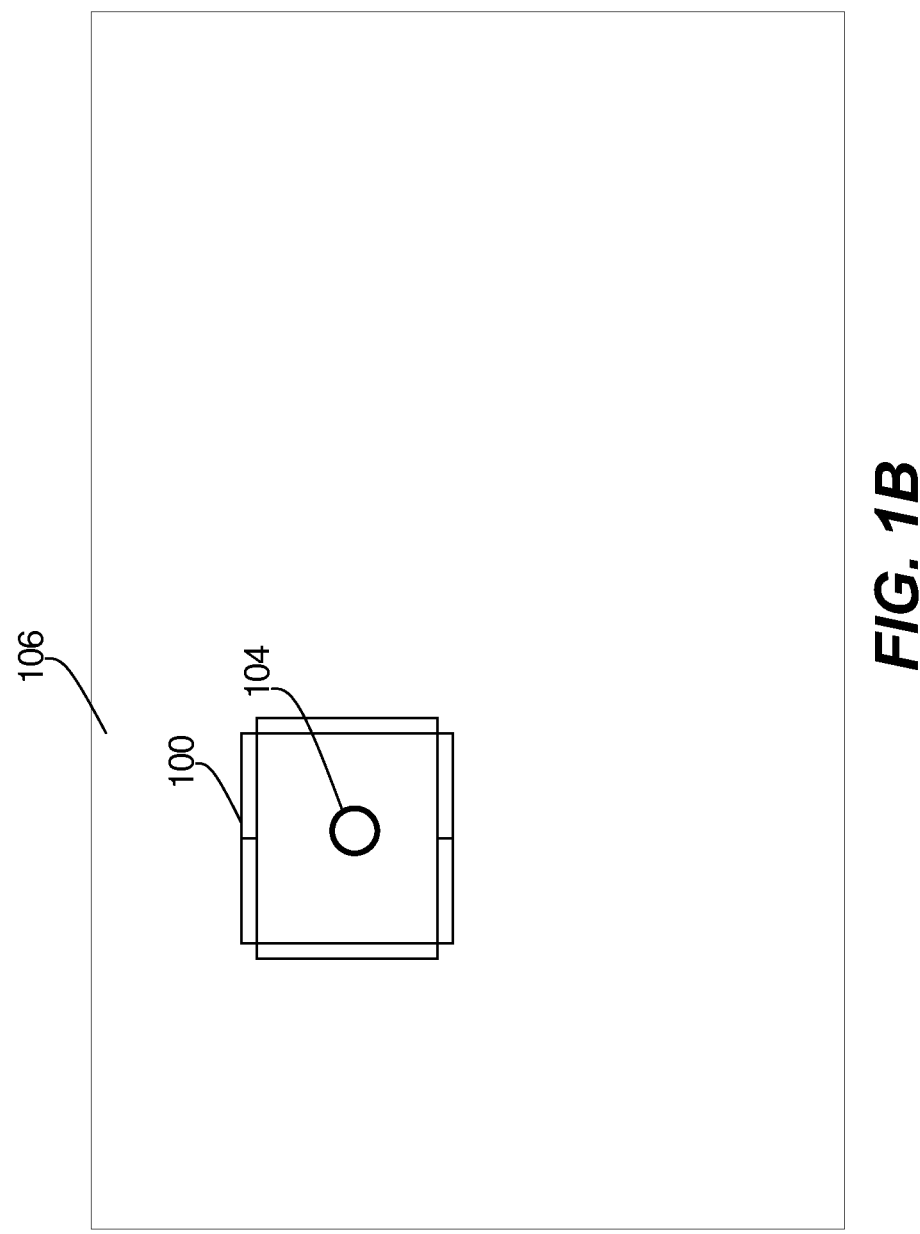

VARIABLE FLOWER DISPLAY BACKLIGHT SYSTEM

CROSS-REFERENCE TO RELATED APPLICATIONS

This application claims priority to U.S. Provisional Patent Application No. 61/251,652 filed 14 Oct. 2009, which is hereby incorporated by reference in its entirety.

TECHNOLOGY

The present invention relates general to display systems, and in particular, to light sources in display systems.

BACKGROUND

In a display system, a plurality of light-emitting diodes (LEDs) may be used together as a single backlight unit (BLU). Each LED may be configured to provide light to a specific portion of a display area. Due to the point-spread-function (PSF) associated with it, an LED may leak light into neighboring portions on the display area, beyond a configured specific portion. Such light leakage degrades image quality and causes artifacts such as halos in the neighboring portions. The light leakage may significantly impact the ability of a display system to show fine image details in a high dynamic range.

In some approaches, light from an LED may be guided through a reflective channel and thus confined to a specific portion of a display area. However, a reflective channel typically creates a sharp change in light intensity around the edges of the specific portion of the display area. Pixels right outside the specific portion may receive too little illumination, while pixels inside the specific portion may receive too much illumination. This results in deleterious image effects. For example, if a character or an important image detail overlaps both sides of the specific portion, different parts of the same character or image detail may experience dramatically different light intensities. Consequently, it is difficult for a viewer to see the character or image detail.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 1A illustrates an example variable flower assembly with an example light-emitting element, according to a possible embodiment of the present invention;

FIG. 1B illustrates an example variable flower assembly with a light-emitting element, mounted on a circuit board, according to a possible embodiment of the present invention;

DESCRIPTION OF EXAMPLE POSSIBLE EMBODIMENTS

Figure 1C:
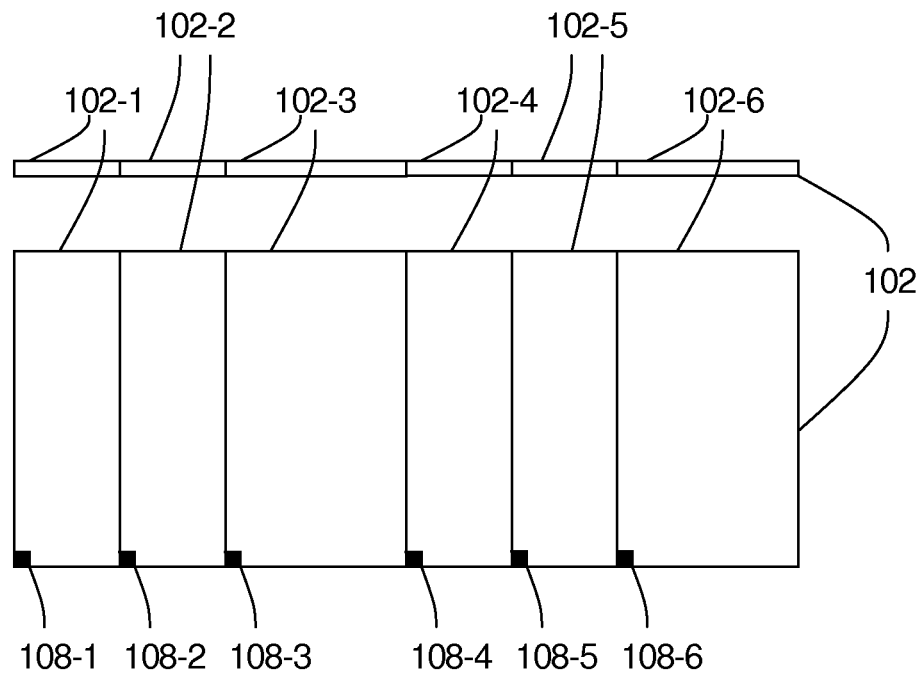
FIG. 1C illustrates an example correspondence between light-transmissive segments of an variable flower assembly and light-transmissive segments of a linear strip, according to a possible embodiment of the present invention.

Example possible embodiments, which relate to VARIABLE FLOWER DISPLAY BACKLIGHT SYSTEM, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily including, obscuring, or obfuscating the present invention.

Example embodiments are described herein according to the following outline:

1. GENERAL OVERVIEW
2. STRUCTURE OVERVIEW
3. EXAMPLE CONTROL OF LIGHT LEAKAGE
4. EXAMPLE VARIABLE FLOWER ASSEMBLY ARRAYS
5. EXAMPLE HALO EFFECT REDUCTION
6. EXAMPLE PROCESS FLOW
7. EQUIVALENTS, EXTENSIONS, ALTERNATIVES AND MISCELLANEOUS

1. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

In some possible embodiments, a plurality of light-emitting elements collectively provides a light source in a display system. Each light-emitting element may be assigned to provide illumination on a portion of a first surface of a diffuser. In some embodiments, the light-emitting elements are mounted on one or more circuit boards; the diffuser may be positioned at a distance away from, and has the first surface substantially parallel to, the circuit boards.

Due to its point-spread-function (PSF), a light-emitting element may illuminate an area larger than the assigned portion of the first surface of the diffuser. For example, while the assigned portion may be a specific rectangular shape, the illuminated area by the light-emitting element with its particular point-spread-function may be a circular area encompassing, and hence larger than, the assigned portion, provided that no external obstacle is erected between the light-emitting element and the first surface of the diffuser. The illuminated area comprises a central portion, e.g., the assigned portion, and a remainder portion beyond the assigned portion. This remainder portion typically reaches out to, and overlaps with, assigned portions of neighboring light-emitting elements. By the same analysis, neighboring light-emitting elements may have their remainder portions overlapping with the assigned portion of the light-emitting element.

Without using techniques as described herein, even if the light-emitting element is turned off to indicate a dark black state for the assigned portion, light from neighboring light-emitting elements may nevertheless illuminate overlapping portions inside the assigned portion, thereby creating an incorrect illumination level other than the dark black state for the assigned portion. This will further distort luminance values of pixels that are associated with the assigned portion, thereby adversely affecting image quality in the display system because the luminance values of the pixels will no longer be correctly correlated to desired pixel values from image data.

In accordance with some possible embodiments of the present invention, to control light leakage, each light-emitting element may be centrally placed in a flower assembly. The flower assembly may be a tube. While the light-emitting element may be located at one end of the tube, at the opposite end of the tube is an opening, through which light from the light-emitting element may be guided to the assigned portion on the diffuser. The longitudinal direction of the tube may be substantially perpendicular to the circuit board. Because of the flower assembly, light directed to the remainder portion now travels through the walls that make up the flower assembly. Under techniques as described herein, the intensity of the illumination over the remainder portion by the light-emitting element may be regulated by controlling the transparency levels of the walls in the flower assembly electronically. If a neighboring assigned portion of a neighboring light-emitting element needs more illumination, a higher transparency level may be set for a wall of the flower assembly through which the light from the light-emitting element travels to the neighboring assigned portion. Conversely, if the neighboring assigned portion needs less illumination, a lower transparency level may be set for the wall.

In some possible embodiments, each wall in the flower assembly comprises one or more light-transmissive segments. For example, the flower assembly may be a rectangular tube comprised of four walls with two openings on two opposing ends. Each wall may be a rectangle plate comprising one or more light-transmissive segments. Each light-transmissive segment is an electronically controllable light valve. The transparency level of a light-transmissive segment can be individually controlled to permit light transmission through the light-transmissive segment at different levels. The different transparency levels may include a dark black 0% transparency level at one extreme and a nearly 100% transparency level in the other extreme. In one possible embodiment, a light-transmissive segment is a structure comprising electrodes and a layer of a liquid crystal material. Additionally and/or optionally, the liquid crystal structure may comprise polarization layers and/or retardation films. Optical properties of the liquid crystal structure, including a transparency level, are electronically controllable. For example, the liquid crystal structure may be set in one of a plurality of different transparency levels with the application of different voltages between the electrodes.

In the present example, since the walls of the flower assembly are made of a plurality of light-transmissive segments, the remainder portion illuminated by the light-emitting element may be further divided into a plurality of non-central portions each located in one or more different neighboring assigned portion(s) and each controlled by a corresponding light-transmissive segment. With the flower assembly, even if the central assigned portion illuminated by the light-emitting element is set to maximum illumination, any of the non-central portions can still be set to different levels of illumination, including dark black, all the way up to the same or similar brightness level in the central portion by controlling the transparency level of the corresponding light-transmissive segment.

Under techniques described herein, if a neighboring light-emitting element for a neighboring assigned portion has been turned off, light from the light-emitting element may be prevented from illuminating overlapping portions inside that neighboring assigned portion. This may be accomplished by setting transparency levels of all light-transmissive segments that serve as light valves to the light-emitting element's light directed to the neighboring assigned portion to a minimum transparency level. Consequently, halo effects previously mentioned may be reduced and image quality may be improved in a display system using techniques described herein.

Other possible embodiments include configuring a transmissive switching element on a light-transmissive segment. The transmissive switching element may comprise one or more transistors, and may be coupled to light source control logic that implements techniques described herein. The light source control logic may be configured to set the light-transmissive segment to various transparency levels by driving the transmissive switching element with corresponding data values. For example, the light source control logic may set the light-transmissive segment to a maximum transparency level by driving the transmissive switching element of the light-transmissive segment with a first data value corresponding to a complete transparency level. Likewise, the light source control logic may set the light-transmissive segment to a minimum transparency level by driving the transmissive switching element of the light-transmissive segment with a second data value corresponding to a complete opaqueness transparency level. Other intermediate transparency levels of the light-transmissive segment may be similarly set.

The flower assembly as described herein may not necessarily be a rectangular tube. For example, the flower assembly may be a hexagonal tube or another polygonal shape instead of the rectangular tube. Other shapes may also be used for the flower assembly described herein.

In some possible embodiments, one or more flower assemblies and one or more light-emitting elements may be manufactured together in a unitary structure, which can then be mounted to a surface such as a circuit board as a single composite light source element.

In some possible embodiments, different flower assemblies on a circuit board such as neighboring flower assemblies may share one or more common transmissive segments. In some alternative possible embodiments, different flower assemblies, including neighboring flower assemblies, share no common light-transmissive segment.

In some possible embodiments, sampling logic may be used in addition to or as a part of the light source control logic. The sampling logic is configured to sample image data and determine desired illumination for different portions on the first surface of the diffuser based on pixel values in the image data. The determined desired illumination may be used to determine which transparency level should be set for each of the light-transmissive segments in the flower assemblies.

In some embodiments, a variable flower assembly as described herein forms a part of a display system, including but not limited to a television, a laptop computer, netbook computer, cellular telephone, electronic book reader, point of sale terminal, desktop computer, computer workstation, computer kiosk, PDA and various other kinds of terminals and display units.

In some embodiments, a method comprises providing one or more flower assemblies as described in a display system.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structure Overview

FIG. 1A illustrates a cross-sectional view of an example flower assembly 100. In the illustrated embodiment, the flower assembly 100 is a rectangular tube. The walls of the flower assembly 100 are made of a plurality of light-transmissive segments 102-1 through 102-6. The light-transmissive segments 102-1 through 102-6 collectively surround a light-emitting element 104. In some possible embodiments as illustrated in FIG. 1B, the light-emitting element 104 may be mounted on a circuit board 106 and placed at the center of the flower assembly, which may also be structurally fixed to the circuit board. In some possible embodiments, the light-transmissive segments 102-1 through 102-6 correspond to different sections on one or more strips each of which are made of light-transmissive segments. In a possible example embodiment as illustrated in FIG. 1C 102, the light-transmissive segments 102-1 through 102-6 correspond to different sections on a single strip 102. The strip 102, for example, may be bent to form the flower assembly 100.

Figure 1C:
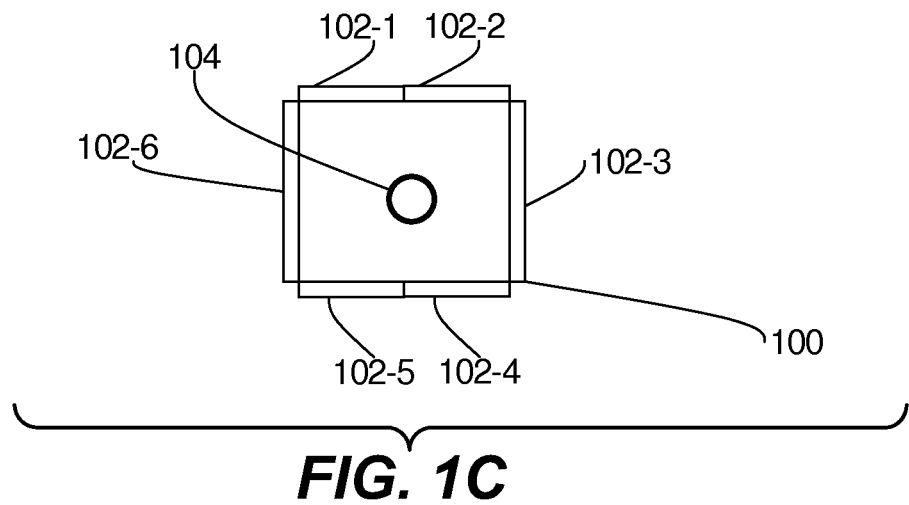
Figure 1D:
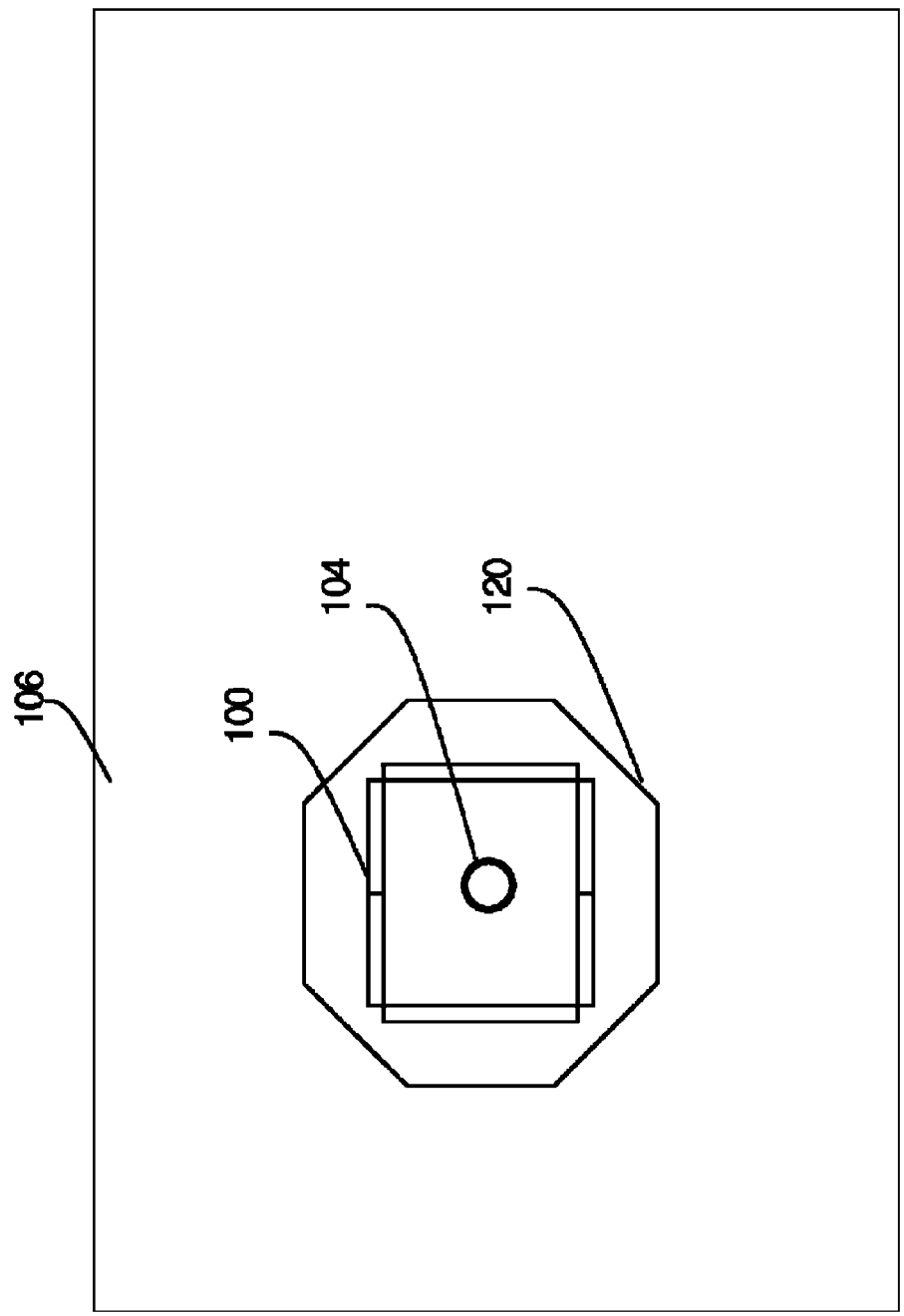
FIG. 1D illustrates an example reflective assembly that surrounds a variable flower assembly, according to a possible embodiment of the present invention.

In some possible embodiments as illustrated in FIG. 1D, the light-emitting element 104 mounted on a circuit board 106 and placed at the center of the flower assembly may be further surrounded by a reflective assembly 120, which may also be structurally fixed to the circuit board. As used herein, the term "at the center" does not necessarily means that the light-emitting element 104 must be placed precisely at the geometric center of the flower assembly, but rather that the light-emitting element 104 may be placed in any of a number of positions around the geometric center of the flower assembly so long as the flower assembly surrounds the light-emitting element 104. For example, the light-emitting element 104 may be placed at a sub-millimeter, a millimeter, or other distances away from the geometric center.

The reflective assembly 120 may comprise a plurality of light-reflective segments in a symmetric or non-symmetric tubular shape. A light-reflective segment may have an optical configuration/structure comprising a metallic surface combined with optical films. The optical films may be electronically controllable to provide different reflectance levels.

In some possible embodiments, a transmissive switching element previously mentioned may be configured on a light-transmissive segment to receive input from control logic for the purpose of setting a transparency level for the light-transmissive segment. For example, as shown in FIG. 1C, transmissive switching elements 108-1 through 108-6 may be configured on the light-transmissive segments 102-1 through 102-6, respectively. Transmissive switching elements 108-1 through 108-6 may be electronically coupled to and driven by light source control logic to any data values in a plurality of data values, each of which may correspond to a transparency level. For example, the transmissive switching element 108-1 may be driven to a first data value that corresponds to minimum transparency. Based on the first data value, the transmissive switching element may cause the light-transmissive segment 102-1 to be set to a 0% transparency level. Likewise, the transmissive switching element 108-2 may be driven to a second data value that corresponds to maximum transparency. Based on this first data value, the transmissive switching element may cause the light-transmissive segment 102-1 to be set to a 90% or more transparency level. Other intermediate transparency levels may be similarly set based on their corresponding data values.

In some possible embodiments, a reflective switching element may be configured on a light-reflective segment to receive input from control logic for the purpose of setting a reflectance level for the light-reflective segment. The reflective switching element may be electronically coupled to and driven by light source control logic to any data values in a plurality of data values, each of which may correspond to a reflectance level. For example, the reflective switching element may be driven to a first data value that corresponds to minimum reflectance. Based on the first data value, the reflective switching element may cause the light-reflective segment to be set to a 0% reflectance level. Likewise, the reflective switching element may be driven to a second data value that corresponds to maximum reflectance. Based on this first data value, the reflective switching element may cause the light-reflective segment 102-1 to be set to a 100% reflectance level. Other intermediate reflectance levels may be similarly set based on their corresponding data values.

Figure 2A:
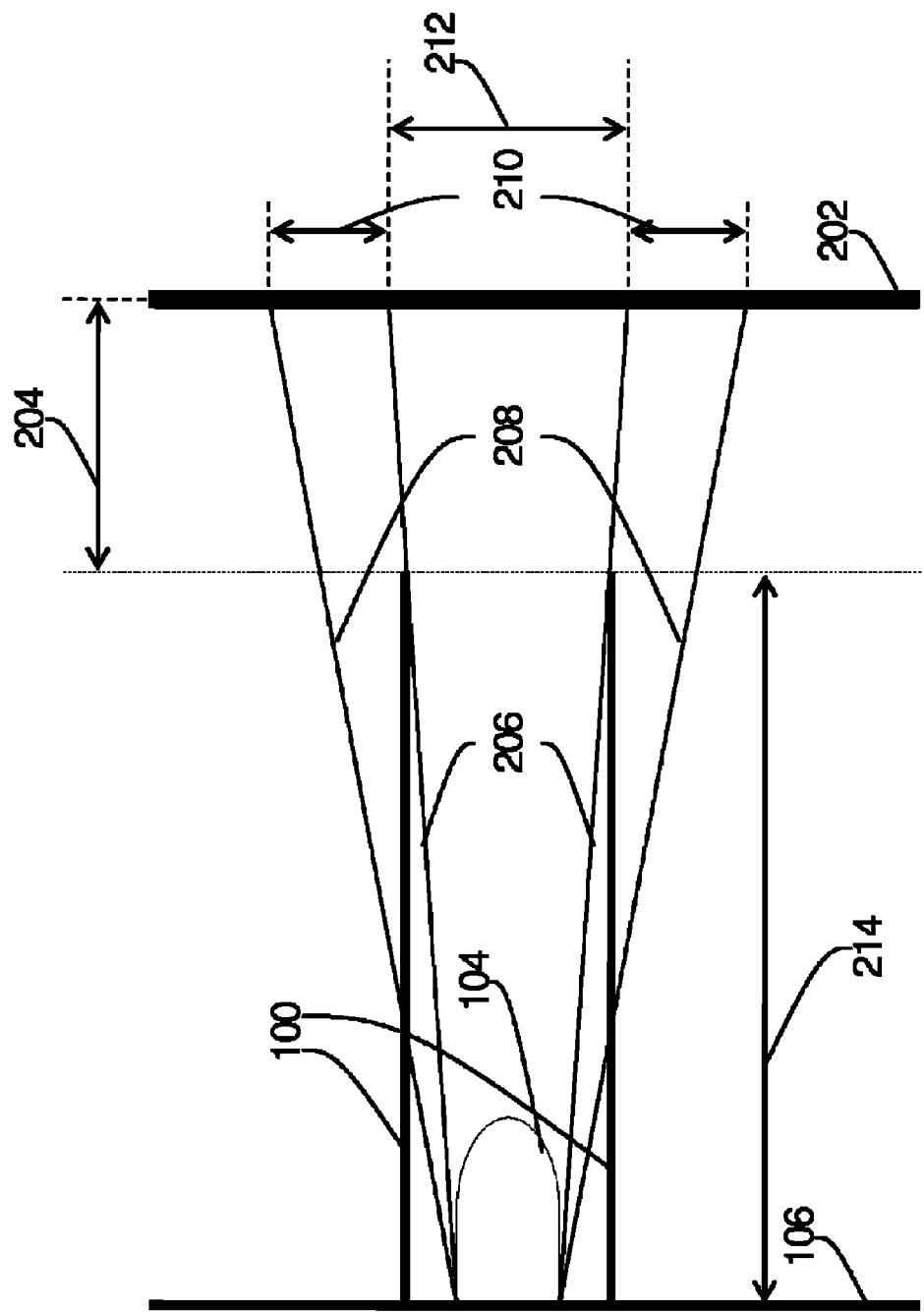
FIG. 2A, FIG. 2B, and FIG. 2C illustrate non-limiting possible embodiments in which an example light-emitting element surrounded by a variable flower assembly illuminates a surface portion of a diffuser.
Figure 2B:
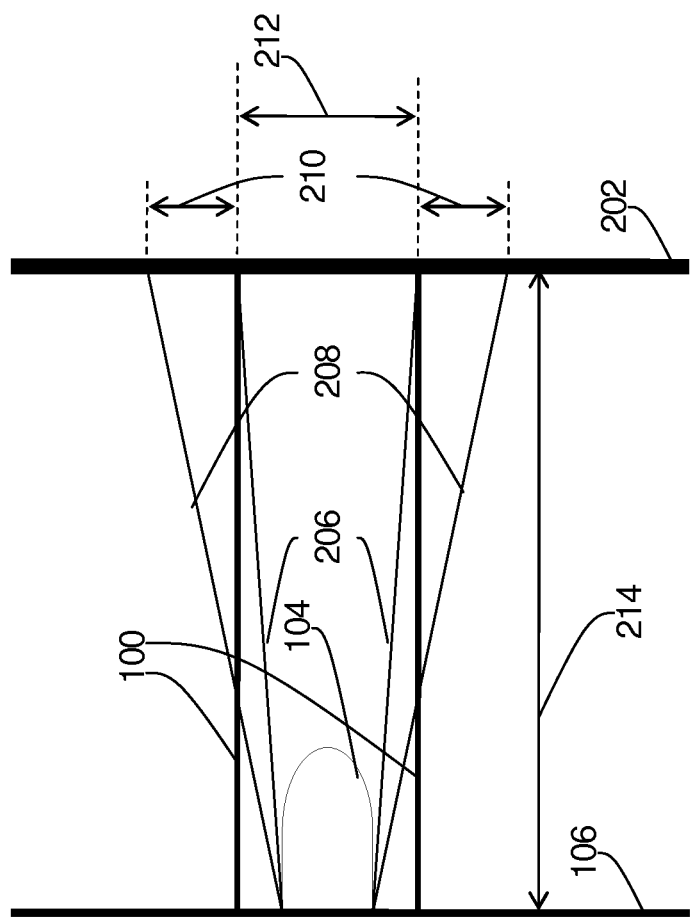

FIG. 2A illustrates another cross-sectional view of the flower assembly 100. In the illustrated embodiment, the light-emitting element 104 is mounted on the circuit board 106 and centrally placed at one end of the flower assembly 100, which may also be mounted to or structurally attached to the circuit board 106. In this illustrated embodiment, there is a spatial gap 204 between the other end, an opening, of the flower assembly 100 and a first surface of a diffuser 202. Through the opening of the flower assembly 100, light 206 from the light-emitting element 104 illuminates a central portion 212 on the first surface of the diffuser 202. Through the walls of the flower assembly 100, light 208 from the light-emitting element 104 may illuminate a remainder portion 210 on the first surface of the diffuser 202. As illustrated, the distance between the first surface of the diffuser 202 and the circuit board 106 may approximately be the sum of a length 214 of flower assembly 100 and the spatial gap 204.

Figure 2C:
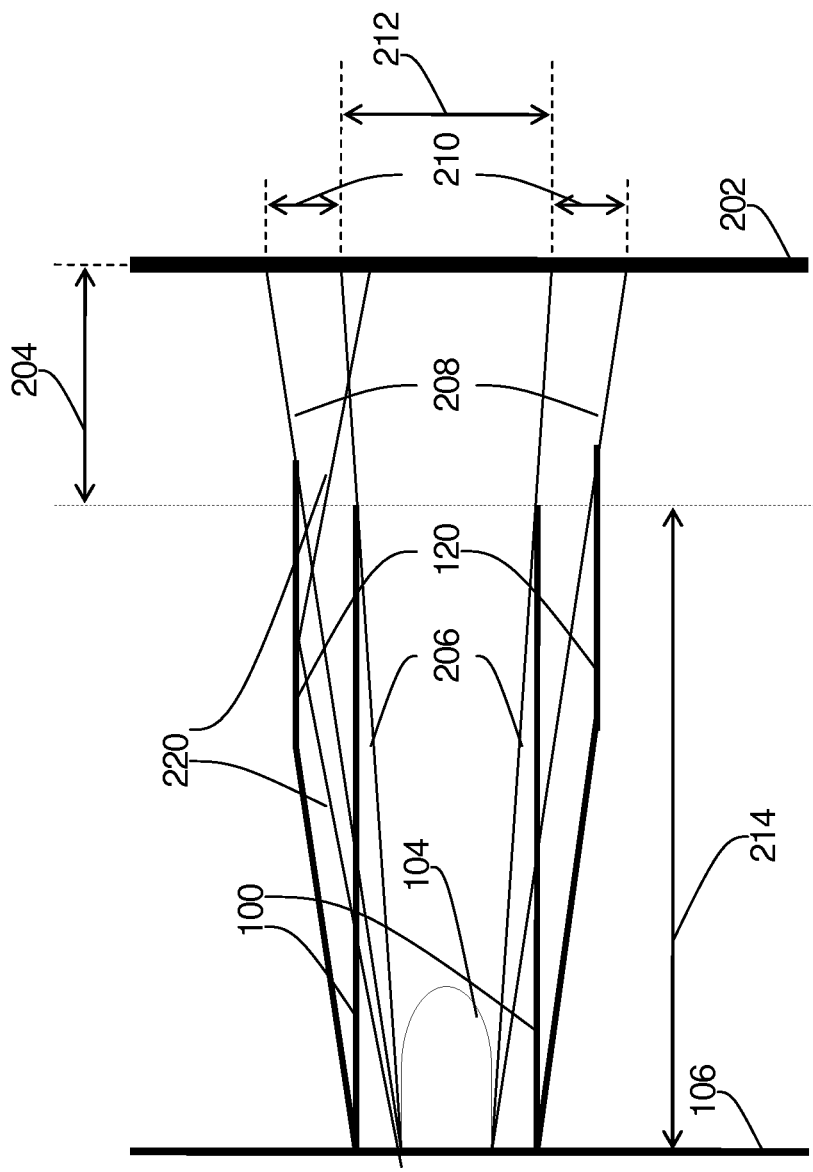

FIG. 2C illustrates an alternative configuration in which the flower assembly 100 is further surrounded by a reflective assembly 120. In this possible example embodiment, the reflective assembly 120 reflects a part of light passed through the flower assembly, for example, 220 of FIG. 2C, to the first surface of the diffuser 202. This increases illumination on the assigned portion 212.

The display system described herein may be used to display video images based on image data. The light-emitting element 104 may be one of many light-emitting elements that are collectively acting as the light source in the display system. Each of the light-emitting elements may be designated to illuminate a different portion of the first surface of the diffuser 202. The light from the light-emitting elements exits through a second surface of the diffuser 202 and illuminates a display panel that comprises an array of pixels. Each pixel in the display panel may comprise sub-pixels for three or more component colors. A pixel value in the image data may be used to determine how much light should be transmitted by each sub-pixel of a pixel to a viewer. To express the pixel value correctly, the light to be transmitted through, or in reflective display systems reflected from, a sub-pixel or a pixel must be accurately regulated according to the pixel value. Depending on the image data, a group of pixels in proximity on the display panel that relate to a very luminous part of the image may require high illumination intensity, while a different group of pixels in proximity on the same display panel that relate to a detailed indoor scene for the same image may require different illumination intensity. While the transmissive or reflective properties of a pixel or sub-pixel is set based on the pixel value, the light source should also be controlled in such a way that accurate illumination is provided to different parts of the display panel based on the image data. Illumination provided to one group of pixels should not leak to a different group of pixels in an uncontrolled manner that reduces fidelity and contrast in the image.

3. Example Control of Light Leakage

Figure 3A:
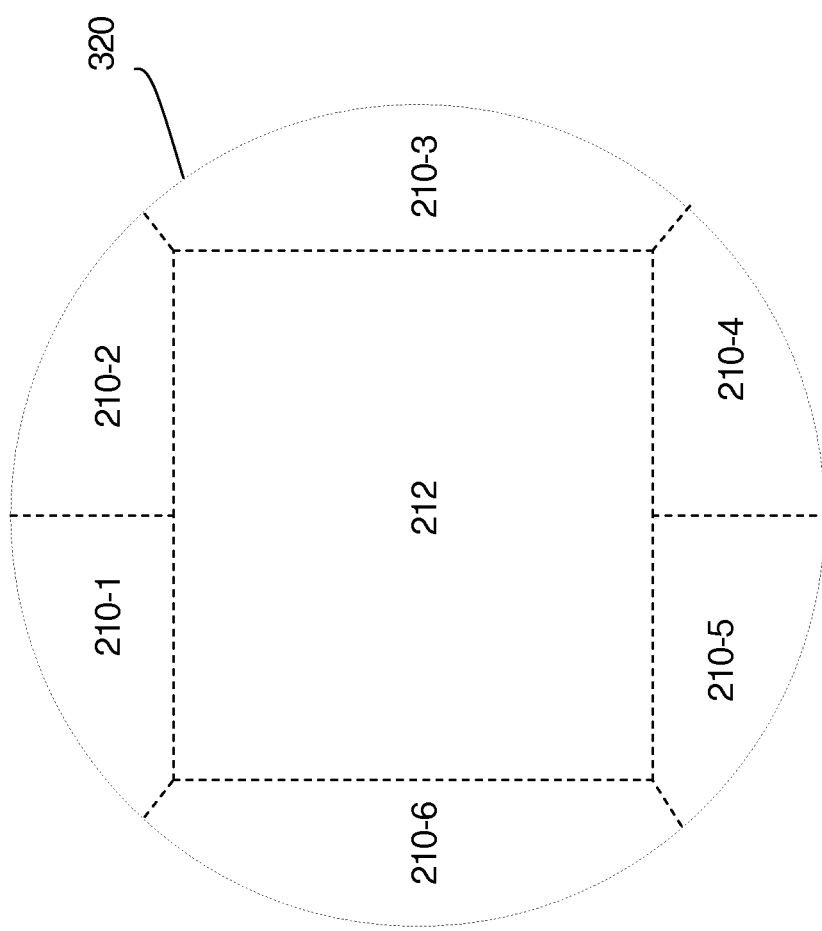
FIG. 3A and FIG. 3B illustrate non-limiting possible embodiments in which light from one light-emitting element to designated surface portions of neighboring light-emitting elements may be controlled using light-transmissive segments of a variable flower assembly.

Different types of light-emitting elements may be associated with different point-spread-functions, and thus may create different shapes for illuminated areas. For illustration purposes, the point-spread-function of the light-emitting element 104 causes a circular area 220 of illumination on the first surface of the diffuser 202 without the flower assembly 100, as shown in FIG. 3A. However, due to the flower assembly 100, the illuminated area 220 is segmented into the central assigned portion 212 and the remainder portion 210. The remainder portion 210 is further segmented into a plurality of non-central portions 210-1 through 210-6. Each of the light-transmissive segments 102-1 through 102-6 controls illumination over a different one of the non-central portions 210-1 through 210-6.

Figure 3B:
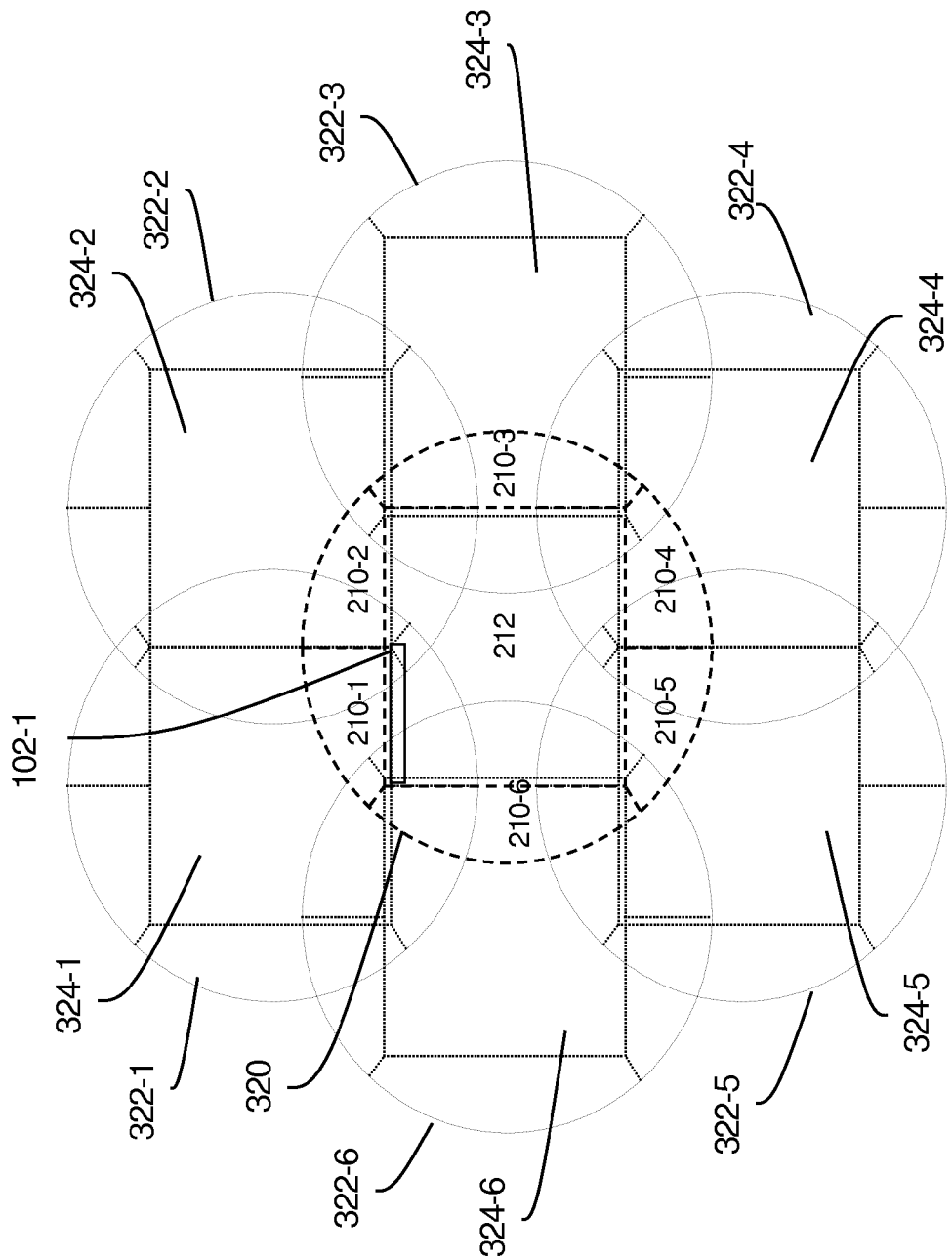
Figure 4A:
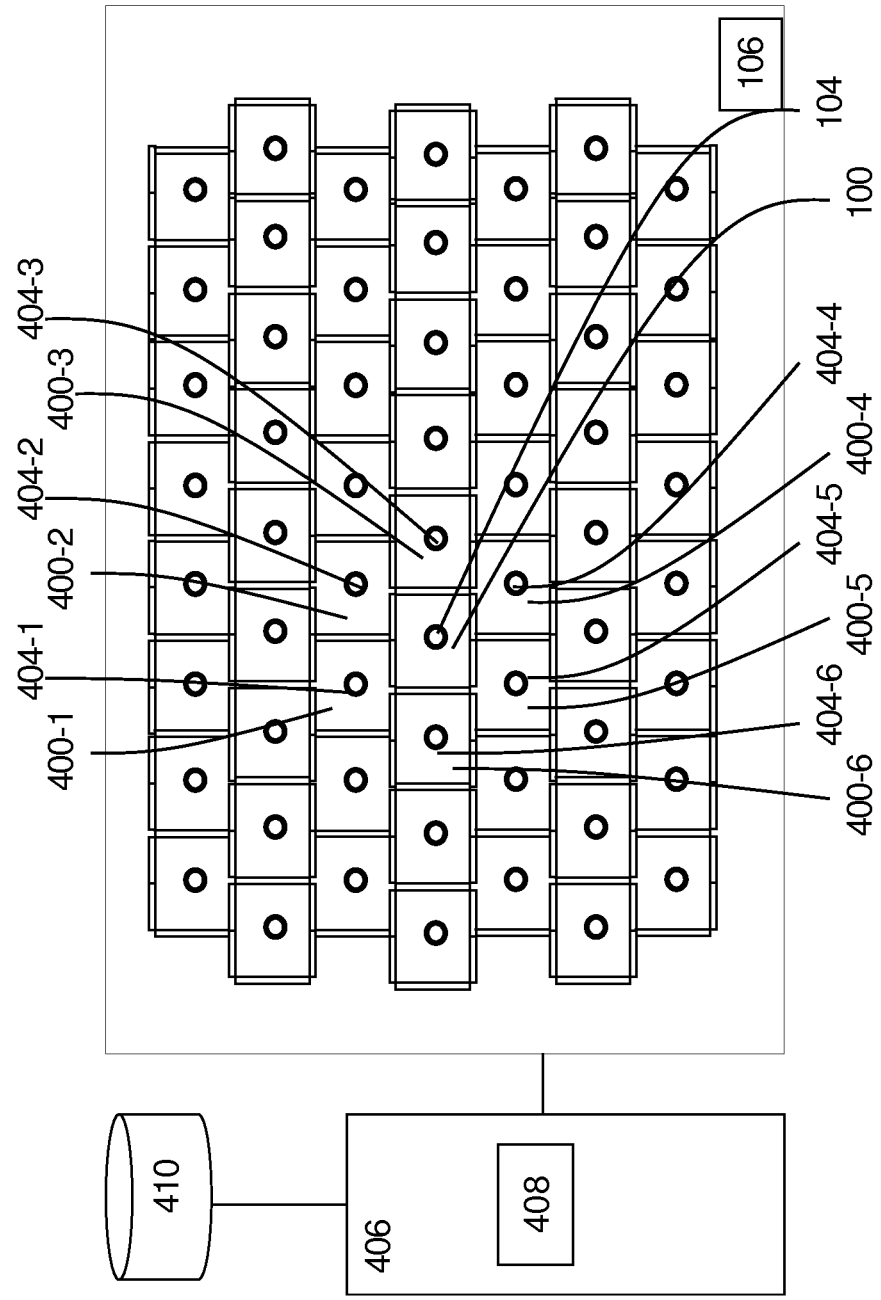
FIG. 4A and FIG. 4B illustrate non-limiting possible embodiments in which light-emitting elements and variable flower assemblies may be placed in example hexagonal and rectangle arrays.
Figure 4B:
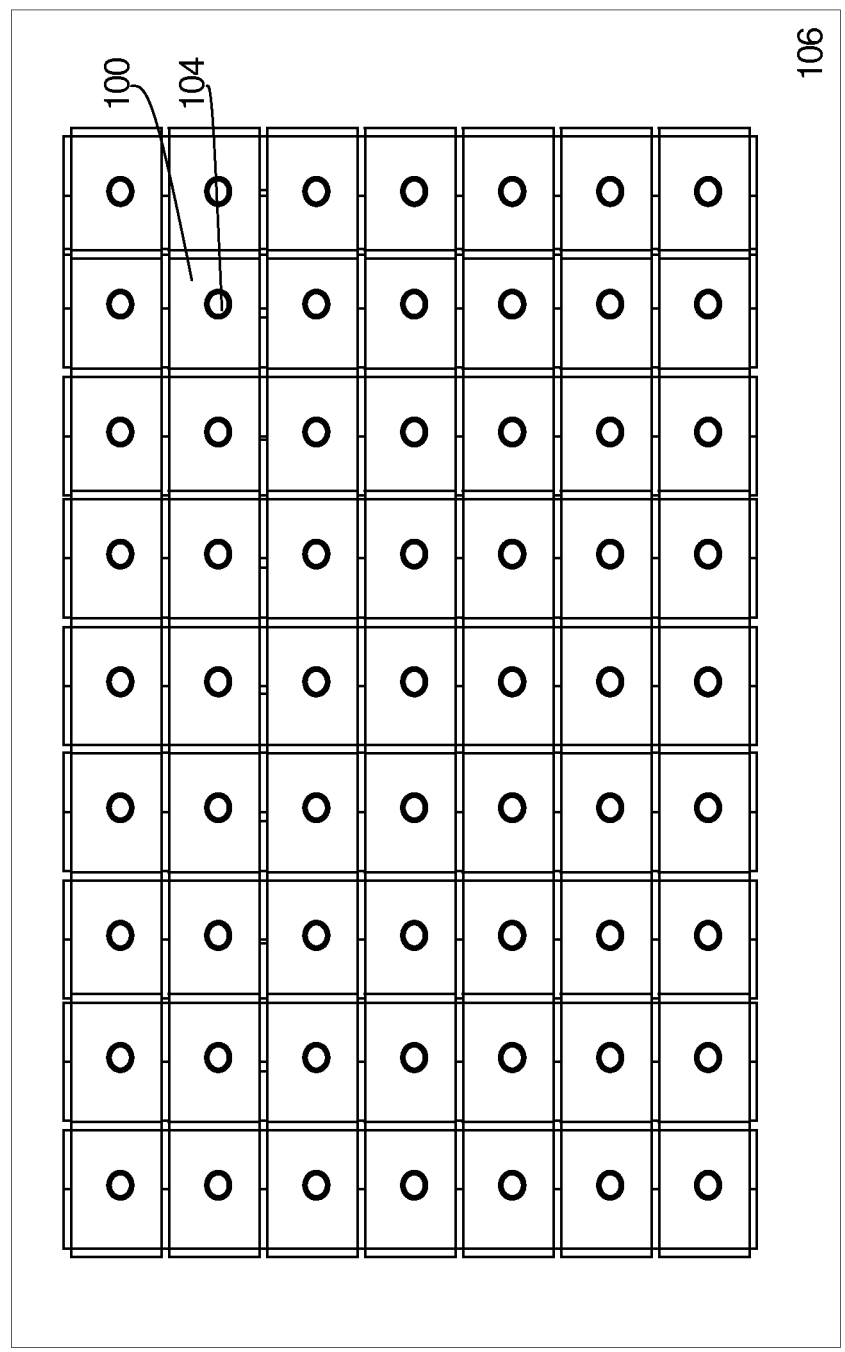

As shown in FIG. 4A and FIG. 4B, a light-emitting element such as 104 may be surrounded by a plurality of neighboring light-emitting elements. These neighboring light-emitting elements may create their own illuminated areas such as 322-1 through 322-6 illustrated in FIG. 3B. The non-central portions 210-1 through 210-6 illuminated by the light-emitting element 104 extend over designated areas 324-1 through 324-6 of the neighboring light-emitting elements.

Under light source control techniques as described herein, each light-emitting element may be placed in a different flower assembly. Since the transparency level of each light-transmissive segment in a flower assembly can be controlled, unwanted light leakage from a light-emitting element to its neighbors' designated portion of illumination can be effectively controlled.

The light source control logic is configured to set the operational states of the light-emitting elements to provide the desired illumination on a surface such as the first surface of the diffuser 202. In some possible embodiments, light-emitting elements may have only one operational state: always on. In some possible embodiments, light-emitting elements may have two or more operational states: off, on (a maximum illumination state), and one or more intermediate illumination states.

In some possible embodiments, based on the image data, light source control logic as described herein may determine that a central designated portion 212 for a light-emitting element 104 should be illuminated at a certain level and accordingly determine that the light-emitting element 104 should be set in a corresponding operational state. This determination may be repeated by the light source control logic for all the light-emitting elements in the system.

In some possible embodiments where variable flower assemblies are further surrounded by reflective assemblies, based on the image data, light source control logic as described herein may determine a reflectance level for each light-reflective segment in a reflective assembly. For example, if the central designated portion 212 requires more illumination than that directly received from the light-emitting element 104, reflectance levels of light-reflective segments in the reflective assembly 120 may be set to a high reflectance level, even a total reflection level. Other reflectance levels may also be set if so determined by the light source control logic.

In some possible embodiments, based on the image data, the light source control logic may determine transparency levels for all the light-transmissive segments that separate one light-emitting element from another. The light source control logic may identify a plurality of neighboring designated portions that may potentially be affected by light leakage from a light-emitting element. The light source control logic may further identify a plurality of light-transmissive segments that may be used to control the potential light leakage. For example, as illustrated in FIG. 3B, the light source control logic may identify three designated portions 212, 324-1 and 324-6 that may be affected by light leakage from the light-emitting element 104 and that the light-transmissive segment 102-1 may be used to control this potential light leakage.

The light source control logic may implement one of several possible algorithms to determine an appropriate transparency level for a light-transmissive segment such as 102-1 of FIG. 3B. In one possible embodiment, the transparency level for the light-transmissive segment may be set to be proportional to the average desired illumination level for all the designated portions affected by the light-transmissive segment. In another possible embodiment, the transparency level for the light-transmissive segment may be set to be proportional to the average desired illumination level for the top two designated portions most affected by the light-transmissive segment. In one possible embodiment, the transparency level for the light-transmissive segment may be set to be proportional to the lower desired illumination level for two designated portions most affected by the light-transmissive segment. In yet another possible embodiment, the transparency level for the light-transmissive segment may be set to be proportional to a weighted average desired illumination level for all the designated portions affected by the light-transmissive segment. Weight factors may be assigned to overlapped regions based on the sizes of the regions.

In some possible embodiments, the light source control logic may implement an algorithm to determine a transparency level for a light-transmissive segment based in part on the difference between desired illumination levels of two designated portions most affected by the light-transmissive segment. If the difference is within a configured threshold value, the transparency level for the light-transmissive segment may be inversely related to the difference. Under this algorithm, if the desired illumination levels are the same or similar, the transparency level may be set to the maximum or close to the maximum transparency level. However, if the desired illumination levels are different, the transparency level may be set to a smaller transparency level. If the desired illumination levels are different exceeding the configured threshold value, the transparency level may be set to the minimum transparency value.

In some possible embodiments, the aforementioned difference may be divided by the average of the desired illumination levels involved in calculating the difference. The aforementioned algorithms may be modified to use the difference modulo the average, instead of directly using the difference between desired illumination levels.

Algorithms to determine a transparency level of a light-transmissive segment as described herein are for illustration purposes only. One, two, or more of the above-described algorithms may be used to determine a transparency level for a light-transmissive segment. Other reasonable algorithms may also be alternatively and/or alternatively used in determining transparency levels for light-transmissive segments.

Relating to the illustrated configuration in FIG. 3B, the light source control logic may determine based on the received image data that the light-emitting element 104 should be in an "on" state, or a maximum illumination state. However, the light source control logic may determine based on the same received image data that a first neighboring light-emitting element should be in an "off" state. For illustration purposes, this first neighboring light-emitting element may be designated to illuminate the neighboring designated portion 324-1. To prevent light leakage from the light-emitting element 104 to the neighboring designated portion 324-1, the light source control logic may determine that the light-transmissive segment 102-1 in the flower assembly 100 should be set to minimum transparency. With these settings, the non-central portion 210-1 is configured to receive little or no illumination from the light-emitting element 104.

Similarly, the light source control logic may determine based on the received image data that a second neighboring light-emitting element should be in an "on" state, or a maximum illumination state. For illustration purposes, this second neighboring light-emitting element may be designated to illuminate the neighboring designated portion 324-6. Since desired illumination levels for both the designated portions 324-6 and 212 are highly similar, based on some example light control algorithms, the light source control logic may set the light-transmissive segment 102-6 in the flower assembly 100 to maximum transparency. As a result, the non-central portion 210-6 overlapping the neighboring designated portion 324-6 receives maximum illumination from the light-emitting element 104. This may be desired when a designated portion needs more illumination than a single light-emitting element can provide, for example, in order to provide an extra high contrast ratio between the lowest luminance point and the highest luminance point in an image.

It may be noted that a non-central portion from a light-emitting element may partially overlap more than one neighboring designated portions. For example, the non-central portion 210-6 illuminated by the light-emitting element 104 may illuminate two neighboring designated portions 324-1 and 324-6. Some example algorithms to determine transparency levels for light-transmissive segments may assign each partially overlapped region a weight factor that is proportional to the size of overlapped region between a designated portion and a non-central portion. For example, an overlapped region between the neighboring designated portion 324-1 and the non-central portion 210-6 is relatively small, as compared with another overlapped region between the neighboring designated portion 324-6 and the non-central portion 210-6. Thus, relative to non-central portion 210-1 of the light-emitting element 104, a weight factor assigned to the neighboring designated portion 324-1 may be smaller than another weight factor assigned to the neighboring designated portion 324-6. In determining the transparency level for a light-transmissive segment, these weight factors may be used to rank and/or select the most affected designated portions, or used to compute averages and differences of desired illumination levels.

4. Example Variable Flower Assembly Arrays

The light-emitting elements in the display system can be arranged in various configurations. FIG. 4A illustrates a configuration in which the light-emitting elements are arranged in a two-dimensional array at centers and vertexes of a plurality of hexagons on the circuit board 106. Since human eyes are more susceptible to detecting vertical and horizontal lines, this hexagonal arrangement reduces possibility of a viewer detecting any artificial optical effect caused by the arrangement of the light-emitting sources. FIG. 4B illustrates an alternative configuration in which the light-emitting elements are arranged in a two-dimensional array at vertexes of a plurality of rectangle on the circuit board 106. It should be noted that these arrangements in FIG. 4A and FIG. 4B are used to illustrate two clear examples. Other configurations may be used to place the light-emitting elements in a two-dimensional array. Furthermore, not all the light-emitting elements are required to be in the same two-dimensional array, or on the same circuit board. For example, light-emitting elements as described herein may be in separate two-dimensional arrays on separate circuit boards, each of which may be responsible for illuminating a subdivision of a surface such as the first surface of the diffuser 202.

As illustrated in FIG. 4A, light-emitting elements 404-1 through 404-6 are neighboring light-emitting elements with respect to the light-emitting element 104. Like the light-emitting element 104, each of the light-emitting elements 404-1 through 404-6 is surrounded in its own flower assembly such as 400-1 through 400-6 in an illustrated possible embodiment. The light-emitting elements and the flower assemblies in the two-dimensional array of FIG. 4A may be of a similar or same type.

Designated portions for light-emitting elements in the two-dimensional array may be separated by the light-transmissive segments in the flower assemblies. For example, the designated portions for the light-emitting elements 104 and 404-1 of FIG. 4A may be separated by the light-transmissive segment 102-1 of FIG. 1. In some possible embodiments in which light-transmissive segments in a flower assembly and a light-emitting element surrounded by the flower assembly are built in a single unitary structure, each flower assembly for the two light-emitting elements 104 and 404-1 contributes at least one light-transmissive segment to separate one light-emitting element from the other. Therefore, the designated portions for the light-emitting elements 104 and 404-1 of FIG. 4A may be separated by at least two light-transmissive segments in these embodiments.

Light source control logic 406 may be configured to control the light-emitting elements and the light-transmissive segments in the two-dimensional array. The light source control logic 406 may be operatively coupled to transmissive switching elements for the light-emitting elements and the light-transmissive segments. The light source control logic 406 is operatively coupled with an image data source 410 and is configured to receive image data from the image data source 410. The image data may be provided by the image data source 410 in a variety of ways including from over-the-air broadcast, a set-top box, a networked server coupled to the display system, and/or a storage medium. The light source control logic 406 may comprise sampling logic 408 to sample image data and compute, based on the image data, luminance values of a pixel, a group of pixels, or a portion of illuminated surface such as the first surface of the diffuser 202. The results of sampling and computing may be used by the light source control logic 406 to drive the transmissive switching elements for the light-emitting elements and the light-transmissive segments.

5. Example Halo Effect Reduction

Figure 5:
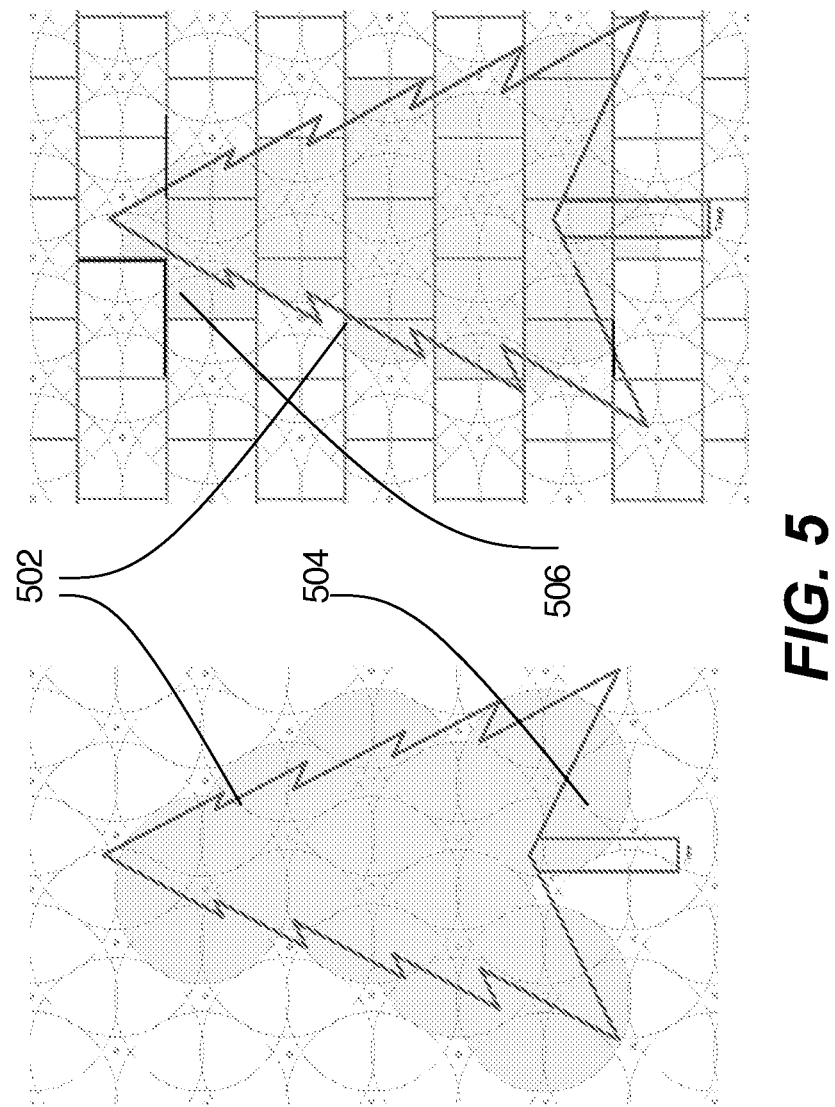
FIG. 5 compares a result of an example image with or without application of light source control techniques described herein.

FIG. 5 shows a comparison between two illuminated areas created with and without using techniques as described herein. Based on image data, the desired illuminated area may be a tree shape 502. Due to the point-spread-functions of light-emitting elements, without light source control techniques as described herein, an illuminated area 504 may be created to approximate the desired illuminated area as determined based on the image data. However, with light source control techniques as described herein, transparency levels of light-transmissive segments surrounding light-emitting elements may be controlled to reduce light leakage caused from the point-spread-functions of the light-emitting elements. The illumination can be much better controlled in the entire portion of the desired illuminated area 502, especially around the edges of the desired illuminated area 502. As a result, an illuminated area 506 with significant reduction of light leakage may be created to approximate the desired illuminated area 502.

6. Example Process Flow

Figure 6:
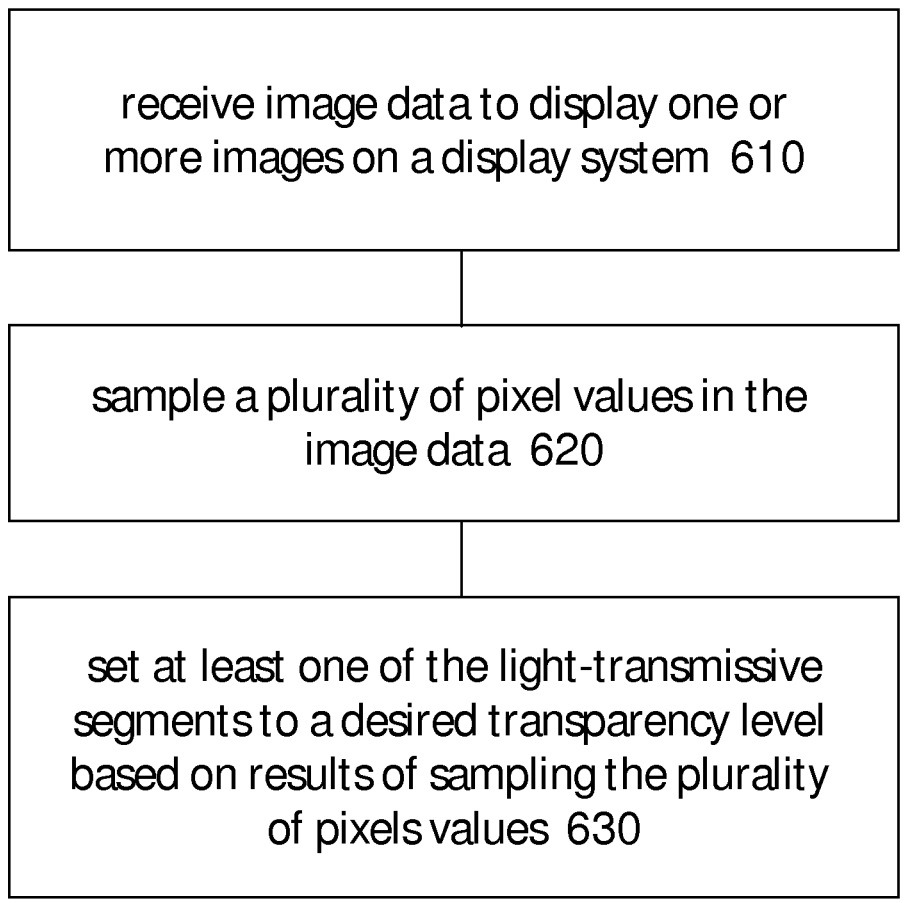
FIG. 6 illustrates an example process flow, according to a possible embodiment.

FIG. 6 illustrates an example process flow according to a possible embodiment of the present invention. In some possible embodiments, one or more computing devices or components in a display system comprising light source control logic 406 and sampling logic 408 may perform this process flow. In block 610, the display system receives image data to display one or more images on a display system. The display system comprises (1) at least a light-emitting element 104 mounted on a first plane and (2) at least a variable flower assembly 100. The variable flower assembly 100 comprises a plurality of light-transmissive segments. Each light-transmissive segment is configured to be set to a separate light-transparency level based on a data value from a data input that is coupled to the variable flower assembly. This data input may be part of a transmissive switching element as described herein.

The variable flower assembly 100 substantially forms a tube around the light-emitting element 104. A first edge of each of the light-transmissive segments collectively surrounds the light-emitting element 104 on a second plane substantially parallel to the first plane. For example, in possible embodiments where the variable flower assembly is a rectangular tube, the first edges of the light-transmissive segments may form a rectangular opening that surrounds the light-emitting element. The first plane may be a planar surface of a circuit board such as 106. A second edge of each of the light-transmissive segments collectively forms an opening of the tube. This opening forms an aperture through which light from the light-emitting element 104 illuminates on an assigned portion 212 of a first surface of a diffuser as previously described. Here, a second edge of each of the light-transmissive segments is opposite to a first edge of the each of the light-transmissive segments.

In block 620, the display system samples a plurality of pixel values in the image data. The plurality of pixel values is to be expressed in a plurality of pixels on a display panel of the display system. The pixels may correspond to neighboring assigned portions 324-1 through 324-6. However, due to the point-spread-function of the light-emitting element 104, the plurality of pixels receives light from the light-emitting element 104 through the light-transmissive segments.

In block 630, the display system sets at least one of the light-transmissive segments to a desired transparency level based on results of sampling the plurality of pixel values. In some scenarios, extra light from the light-emitting element 104 to a neighboring assigned portion may be desirable, for example, to enhance contrast ratios in different parts of an image. In some other scenarios, extra light from the light-emitting element 104 to a neighboring assigned portion may not be desirable, as the luminance level of certain pixels in fine details at low luminance may be dramatically distorted by the extra light or light leakage. The display system therefore may implement an algorithm such as one of those previously described to determine a particular transparency level for a particular light-transmissive segment in the variable flower assembly based on the results of sampling of the image data.

In some possible embodiments in which variable flower assemblies are surrounded by reflective assemblies, the display system sets at least one light-reflective segment in at least one of the reflective assemblies to a desired transparency level based on results of sampling the plurality of pixel values. In some scenarios, light from the light-emitting element 104 that has passed a variable flower assembly may be reflected to increase illumination in the assigned portion, for example, to enhance contrast ratios in different parts of an image. In some other scenarios, reflected light may not be desirable, as the luminance level of certain pixels in fine details at low luminance may be dramatically distorted by the extra reflected light. The display system may determine a particular reflectance level for a particular light-reflective segment in the reflective assemblies based on the results of sampling of the image data.

7. Equivalents, Extensions, Alternatives and Miscellaneous

To illustrate a clear example, a variable flower assembly is depicted as a rectangular tube. It should be noted that other symmetric or non-symmetric shapes may also be used in a variable flower assembly. For example, a variable flower assembly described herein may be a hexagon tube, or any other shape that comprises a plurality of light-transmissive segments and additionally and/or optionally, a reflector outside the light-transmissive segments.

To illustrate a clear example, light source control techniques as described herein may be used to control light leakage from light-emitting elements on a portion of a first surface of a diffuser. It should be noted that the light source control techniques as described herein may also be used to control illumination of light-emitting elements on other surfaces and/or display panels. Further, a surface or a panel illuminated by the light-emitting elements may be a part of any type of display system including a standard LCD panel, a HDR panel, a double-modulation display system, a triple-modulation display system, a display system using a backlight unit, a display system using a front projector, etc. For example, in one example embodiment, light from each of the light-emitting source may illuminate a surface portion of a diffuser. The light in the surface portion of the diffuser may be transmitted to illuminate a first number of pixels on a first coarse-resolution display panel. Light in each of the pixels on the first coarse-resolution display panel may be further transmitted to illuminate a second number of pixels on a second fine-resolution display panel. For example, the fine-resolution display panel may be a viewer display panel with a 1080×1920 resolution, while the number of light-emitting elements in a backlight unit is 1600. In various embodiments, different ratios may be used between the total number of light-emitting elements and the total number of pixels on any display panel for which the light-emitting elements provide a light source.

In some embodiments, since there may be many more pixels than light-emitting elements, sampling logic as described herein may sample a number of pixels in neighboring assigned portions and may perform one or more averaging operations on the sampled pixel data, in order to determine transparency levels of light-transmissive segments and/or reflectance levels of light-reflective segments involved.

To illustrate a clear example, a light-emitting element is described as being associated with a point-spread-function, when no obstacle exists between the light-emitting element and a surface to which light from the light-emitting is directed. Different portions of the point-spread-function such as an assigned portion and a remainder portion may be controlled as transparency and/or reflectance levels of different segments surrounding the light-emitting element are varied.

Alternatively and equivalently, the light-emitting element may be described as being associated with many different possible point-spread-functions. A point-spread-function that provides a desired result of illumination may be selected from the different possible point-spread-functions, as transparency and/or reflectance levels of different segments surrounding the light-emitting element are varied.

To illustrate a clear example, liquid crystal structures may be used to provide light-transmissive segments as described herein. It should be noted that other materials or structures whose transparency levels are controllable may be similarly used. Transparency levels may vary within 0-100%, 3-90%, or other possible ranges.

To illustrate a clear example, metallic surfaces combined with optical films may be used to provide light-reflective segments as described herein. It should be noted that other materials or structures whose reflectance levels are controllable may be similarly used. Reflectance levels may vary within 0-100%, 3-90%, or other possible ranges.

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A variable backlight flower assembly for a display system comprising:
   a plurality of light-transmissive segments each configured to be set to an individual light-transparency level based on a data value from a data input that is coupled to the plurality of light-transmissive segments;
   wherein the plurality of light-transmissive segments physically forms walls of a tube around a light-emitting element mounted on a first plane, wherein each of the light-transmissive segments has a first edge, and wherein the first edges of the light-transmissive segments collectively surround the light-emitting element on a second plane substantially parallel to the first plane, wherein each of the light-transmissive segments has a second edge, and wherein the second edges of the light-transmissive segments collectively form an opening of the tube, and wherein the second edge of each of the light-transmissive segments is opposite to the first edge of the each of the light-transmissive segments;
   wherein the opening of the tube is opposite to the first plane on which the light-emitting element is mounted; and
   wherein light travels through the walls of the tube in a direction non-perpendicular to the first and second planes, and the transparency levels of the walls of the tube are controlled electronically separately from the control of luminance levels of pixels of the display system.

2. The variable backlight flower assembly as recited in claim 1, wherein at least one of the light-transmissive segments comprises a liquid crystal structure further comprising a liquid crystal layer.

3. The variable backlight flower assembly as recited in claim 1, wherein a light-transmissive segment in the plurality of light-transmissive segments transmits maximum light when the light-transmissive segment is set to a maximum transparency level based on the data value.

4. The variable backlight flower assembly as recited in claim 1, wherein a light-transmissive segment in the plurality of light-transmissive segments transmits minimum light when the light-transmissive segment is set to a minimum transparency level based on the data value.

5. The variable backlight flower assembly as recited in claim 1, wherein a light-transmissive segment in the plurality of light-transmissive segments transmits light at an intermediate level when the light-transmissive segment is set to an intermediate transparency level based on the data value.

6. The variable backlight flower assembly as recited in claim 1, wherein the tube is substantially perpendicular to the first plane.

7. The variable backlight flower assembly as recited in claim 1, wherein the tube comprises a non-circular shape, which comprises three or more walls.

8. The variable backlight flower assembly as recited in claim 1, wherein both the tube and the light-emitting element form a unitary structure that is mounted on the first plane.

9. The variable backlight flower assembly as recited in claim 1, wherein the light-emitting element is configured to create an illuminated area on a third plane as determined by a point spread function of the light-emitting element.

10. The variable backlight flower assembly as recited in claim 1, wherein the plurality of light-transmissive segments is surrounded by a reflective assembly.

11. The variable backlight flower assembly as recited in claim 1, wherein the light-emitting element is configured to create an illuminated area on a third plane, wherein the illuminated area comprises a central portion and a plurality of non-central portions, and wherein incidental light from the light-emitting element to a different non-central portion of the plurality of non-central portions is configured to transmit through a different light-transmissive segment in the plurality of light-transmissive segments.

12. The variable backlight flower assembly as recited in claim 11, wherein the third plane comprises a first surface of a diffuser and wherein the opening of the tube is at a distance from the third plane.

13. The variable backlight flower assembly as recited in claim 11, wherein the third plane comprises a surface of a diffuser and wherein the opening of the tube is substantially on the third plane.

14. The variable backlight flower assembly as recited in claim 1, wherein the light-emitting element is configured to create an illuminated area on a third plane as determined by a point spread function of the light-emitting element, wherein the illuminated area includes an assigned portion that is assigned to the light-emitting element to illuminate, wherein the illuminated area includes a remainder portion overlapping with another assigned portion on the third plane, and wherein said another assigned portion is assigned to another light-emitting element to illuminate.

15. The variable backlight flower assembly as recited in claim 14, wherein the light-emitting element and the plurality of light-transmissive segments are a part of a display system that comprises a display panel, wherein the display panel comprises a pixel array, and wherein the assigned portion corresponds to a plurality of pixels in the pixel array.

16. A two-dimensional array of variable backlight flower assemblies for a display system, having a first variable backlight flower assembly, which comprises:
   a plurality of light-transmissive segments each configured to be set to an individual light-transparency level based on a data value from a data input that is coupled to the plurality of light-transmissive segments;
   wherein the plurality of light-transmissive segments physically forms walls of a tube around a light-emitting element mounted on a first plane, wherein each of the light-transmissive segments has a first edge, and wherein the first edges of the light-transmissive segments collectively surround the light-emitting element on a second plane substantially parallel to the first plane, wherein each of the light-transmissive segments has a second edge, and wherein the second edges of the light-transmissive segments collectively form an opening of the tube, and wherein the second edge of each of the light-transmissive segments is opposite to the first edge of the each of the light-transmissive segments;
   wherein the opening of the tube is opposite to the first plane on which the light-emitting element is mounted; and
   wherein light travels through the walls of the tube in a direction non-perpendicular to the first and second planes, and the transparency levels of the walls of the tube are controlled electronically separately from the control of luminance levels of pixels of the display system.

17. The two-dimensional array as recited in claim 16, further having a second variable backlight flower assembly, which comprises:
   a plurality of second light-transmissive segments each configured to be set to an individual light-transparency level based on a second data value from a second data input that is coupled to the plurality of second light-transmissive segments;
   wherein the plurality of second light-transmissive segments physically forms walls of a second tube around a second light-emitting element mounted on the first plane, wherein each of the light-transmissive segments has a third edge, and wherein the third edges of the second light-transmissive segments collectively surround the second light-emitting element on the second plane substantially parallel to the first plane, wherein each of the second light-transmissive segments has a fourth edge, and wherein the fourth edges of the second light-transmissive segments collectively form an opening of the second tube, and wherein the fourth edge of each of the second light-transmissive segments is opposite to the third edge of the each of the second light-transmissive segments;
   wherein light travels through the walls of the second tube in a direction non-perpendicular to the first and second planes, and the transparency levels of the walls of the second tube are controlled electronically separately from the control of luminance levels of pixels of the display system.

18. The two-dimensional array as recited in claim 17, wherein said first variable backlight flower assembly shares no common light-transmissive segment with said second variable backlight flower assembly.

19. The two-dimensional array as recited in claim 17, wherein said first variable backlight flower assembly shares one or more common light-transmissive segments with said second variable backlight flower assembly.

20. A light source system for a display system comprising:
   a first two-dimensional array of light-emitting elements mounted on a first plane;
   a second two-dimensional array of variable backlight flower assemblies, which comprises:
      a plurality of light-transmissive segments each configured to be set to an individual light-transparency level based on a data value from a data input that is coupled to the plurality of light-transmissive segments;
      wherein the plurality of light-transmissive segments physically forms walls of a tube around a light-emitting element mounted on the first plane, wherein each of the light-transmissive segments has a first edge, and wherein the first edges of the light-transmissive segments collectively surround the light-emitting element on a second plane substantially parallel to the first plane, wherein each of the light-transmissive segments has a second edge, and wherein the second edges of the light-transmissive segments collectively form an opening of the tube, and wherein the second edge of each of the light-transmissive segments is opposite to the first edge of the each of the light-transmissive segments;
      wherein the opening of the tube is opposite to the first plane on which the light-emitting element is mounted; and
      wherein light travels through the walls of the tube in a direction non-perpendicular to the first and second planes, and the transparency levels of the walls of the tube are controlled electronically separately from the control of luminance levels of pixels of the display system;
   a light source control logic comprising a plurality of data inputs coupled to the variable backlight flower assemblies, wherein the light source control logic is configured to set each light-transmissive segment in a variable backlight flower assembly in the second two-dimensional array to a separate transparency level based on a separate data value from one of the plurality of data inputs.

21. The light source system as recited in claim 20, further comprising a sampling logic that is configured:
   to estimate desired illumination on a portion of a third plane based on pixel values in image data; and
   to work with the light source control logic to drive a transmissive switching element to set a light-transmissive segment to one in a plurality of transparency levels.

22. A method comprising:
   receiving image data to display one or more images on a display system, wherein the display system comprises (1) at least a light-emitting element mounted on a first plane and (2) at least a variable backlight flower assembly, which comprises:
      a plurality of light-transmissive segments each configured to be set to an individual light-transparency level based on a data value from a data input that is coupled to the plurality of light-transmissive segments;

wherein the plurality of light-transmissive segments physically forms walls of a tube around a light-emitting element mounted on the first plane, wherein each of the light-transmissive segments has a first edge, and wherein the first edges of the light-transmissive segments collectively surround the light-emitting element on a second plane substantially parallel to the first plane, wherein each of the light-transmissive segments has a second edge, and wherein the second edges of the light-transmissive segments collectively form an opening of the tube, and wherein the second edge of each of the light-transmissive segments is opposite to the first edge of the each of the light-transmissive segments;

wherein the opening of the tube is opposite to the first plane on which the light-emitting element is mounted; and wherein light travels through the walls of the tube in a direction non-perpendicular to the first and second planes, and the transparency levels of the walls of the tube are controlled electronically separately from the control of luminance levels of pixels of the display system;

sampling a plurality of pixel values in the image data, wherein the plurality of pixel values is to be expressed in a plurality of pixels on a display panel of the display system, and wherein the plurality of pixels receives light from the light-emitting element through light-transmissive segments of the variable backlight flower assembly; and setting at least one of the light-transmissive segments to a desired transparency level based on results of sampling the plurality of pixel values;

wherein the method is performed by one or more computing devices.

23. A non-transitory computer readable storage medium, comprising instructions, which when performed or executed by a processor, causes, controls or programs the processor to perform a method that comprises the steps of:

receiving image data to display one or more images on a display system, wherein the display system comprises (1) at least a light-emitting element mounted on a first plane and (2) at least a variable backlight flower assembly, which comprises:

a plurality of light-transmissive segments each configured to be set to an individual light-transparency level based on a data value from a data input that is coupled to the plurality of light-transmissive segments;

wherein the plurality of light-transmissive segments physically forms walls of a tube around a light-emitting element mounted on the first plane, wherein each of the light-transmissive segments has a first edge, and wherein the first edges of the light-transmissive segments collectively surround the light-emitting element on a second plane substantially parallel to the first plane, wherein each of the light-transmissive segments has a second edge, and wherein the second edges of the light-transmissive segments collectively form an opening of the tube, and wherein the second edge of each of the light-transmissive segments is opposite to the first edge of the each of the light-transmissive segments;

wherein the opening of the tube is opposite to the first plane on which the light-emitting element is mounted; and wherein light travels through the walls of the tube in a direction non-perpendicular to the first and second planes, and the transparency levels of the walls of the tube are controlled electronically separately from the control of luminance levels of pixels of the display system;

sampling a plurality of pixel values in the image data, wherein the plurality of pixel values is to be expressed in a plurality of pixels on a display panel of the display system, and wherein the plurality of pixels receives light from the light-emitting element through light-transmissive segments of the variable backlight flower assembly; and setting at least one of the light-transmissive segments to a desired transparency level based on results of sampling the plurality of pixel values.

24. A system comprising:

means for receiving image data to display one or more images on a display system, wherein the display system comprises (1) at least a light-emitting element mounted on a first plane and (2) at least a variable backlight flower assembly, which comprises:

a plurality of light-transmissive segments each configured to be set to an individual light-transparency level based on a data value from a data input that is coupled to the plurality of light-transmissive segments;

wherein the plurality of light-transmissive segments physically forms walls of a tube around a light-emitting element mounted on the first plane, wherein each of the light-transmissive segments has a first edge, and wherein the first edges of the light-transmissive segments collectively surround the light-emitting element on a second plane substantially parallel to the first plane, wherein each of the light-transmissive segments has a second edge, and wherein the second edges of the light-transmissive segments collectively form an opening of the tube, and wherein the second edge of each of the light-transmissive segments is opposite to the first edge of the each of the light-transmissive segments;

wherein the opening of the tube is opposite to the first plane on which the light-emitting element is mounted; and wherein light travels through the walls of the tube in a direction non-perpendicular to the first and second planes, and the transparency levels of the walls of the tube are controlled electronically separately from the control of luminance levels of pixels of the display system;

means for sampling a plurality of pixel values in the image data, wherein the plurality of pixel values is to be expressed in a plurality of pixels on a display panel of the display system, and wherein the plurality of pixels receives light from the light-emitting element through light-transmissive segments of the variable backlight flower assembly; and means for setting at least one of the light-transmissive segments to a desired transparency level based on results of sampling the plurality of pixel values.

* * * * *